Figure 1A:
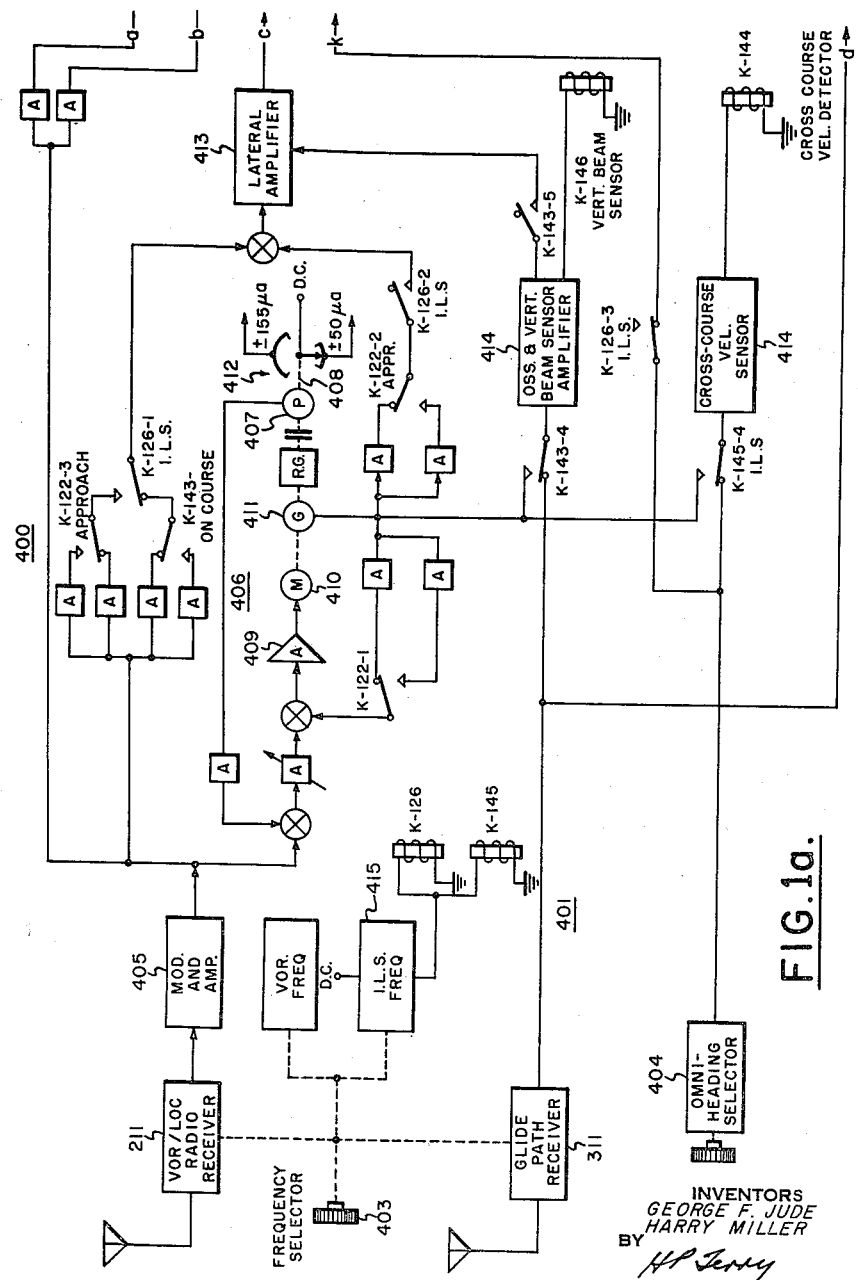

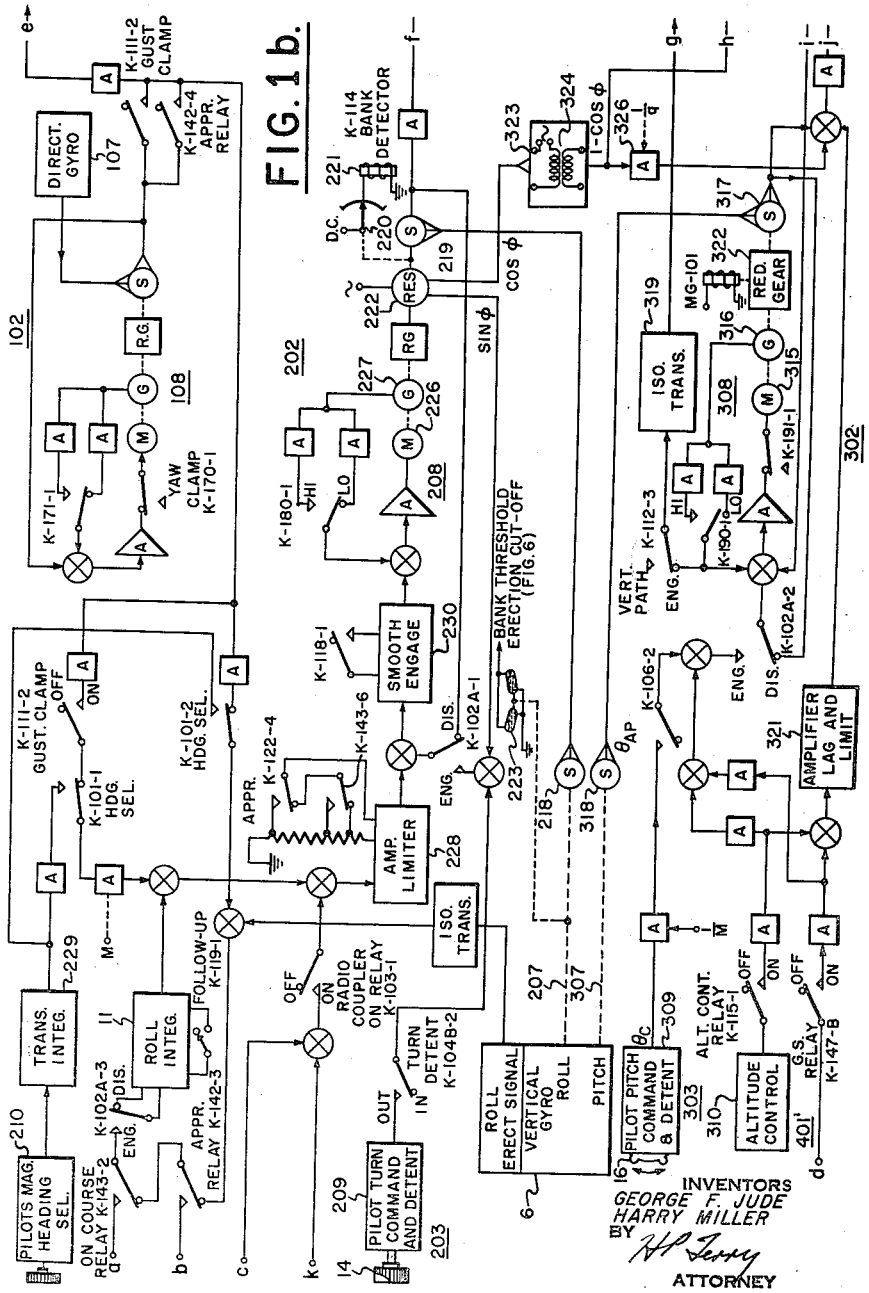

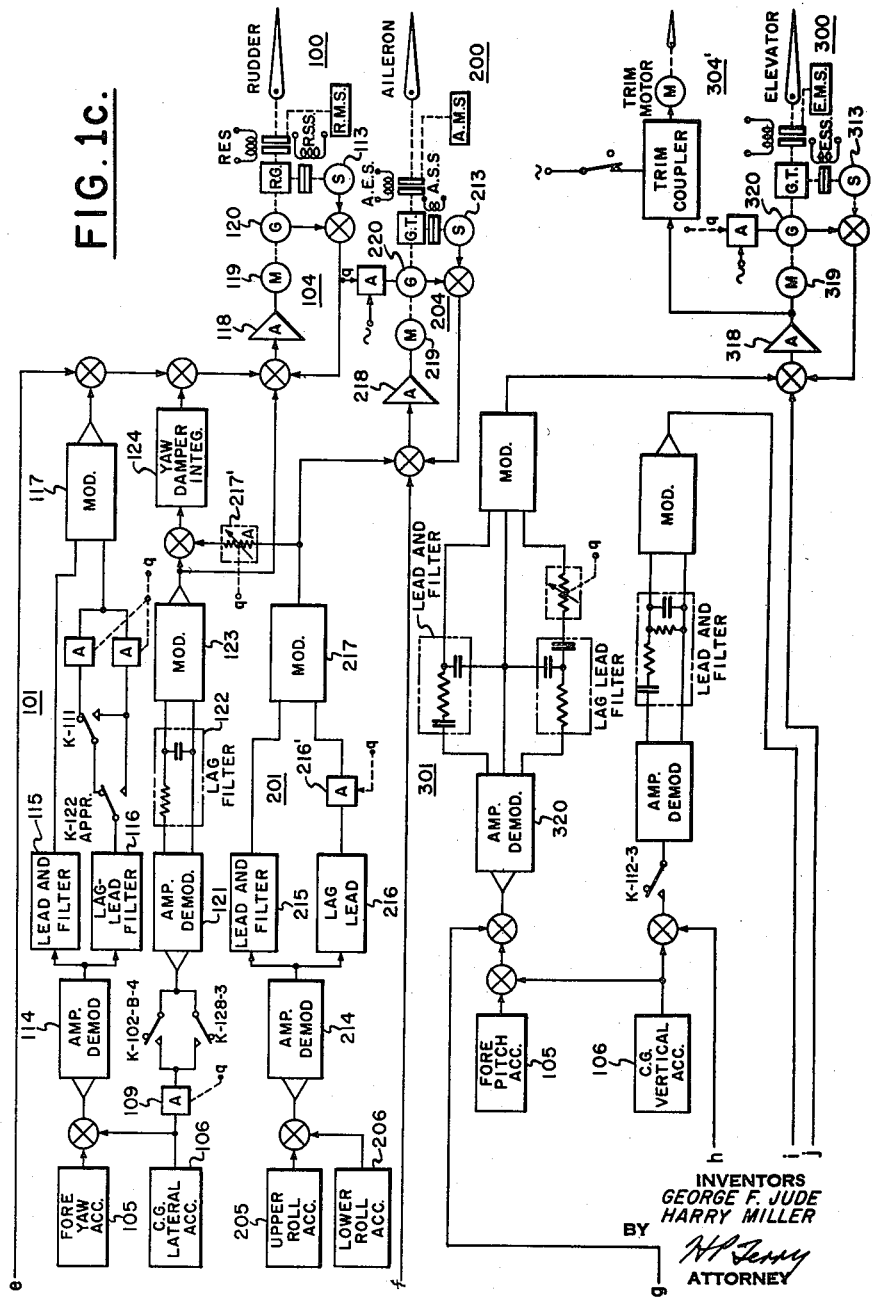

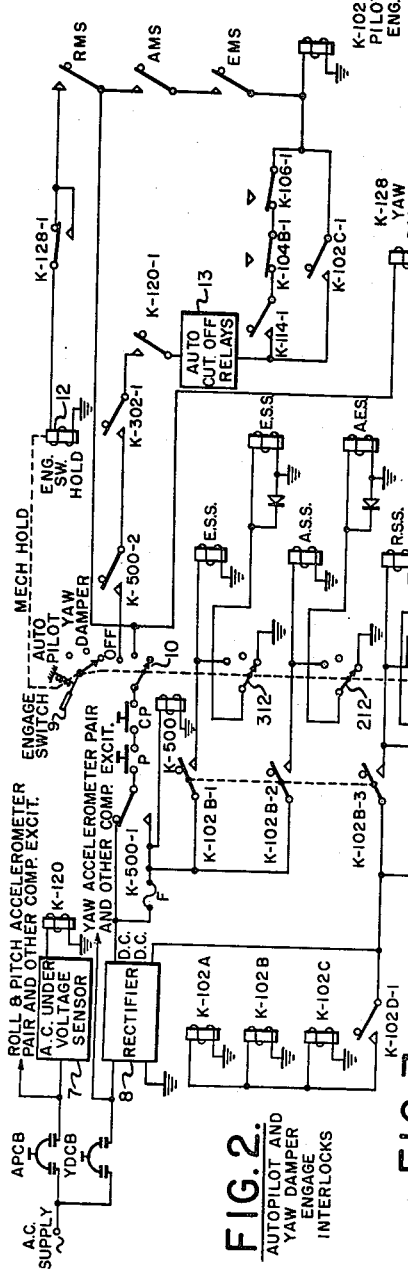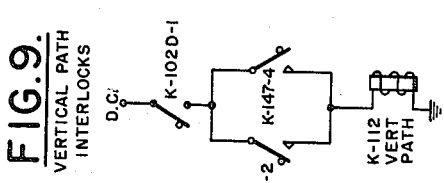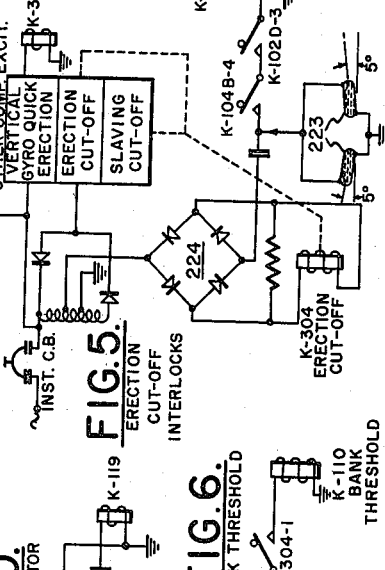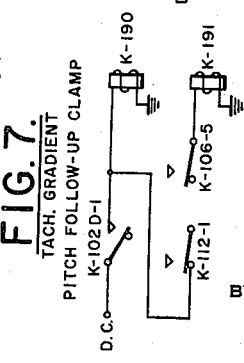
Jan. 7, 1964     G. F. JUDE ETAL     3,116,899
AIRCRAFT AUTOMATIC PILOT
Original Filed May 14, 1959     6 Sheets-Sheet 4
INVENTORS
GEORGE F. JUDE
HARRY MILLER
BY
ATTORNEY

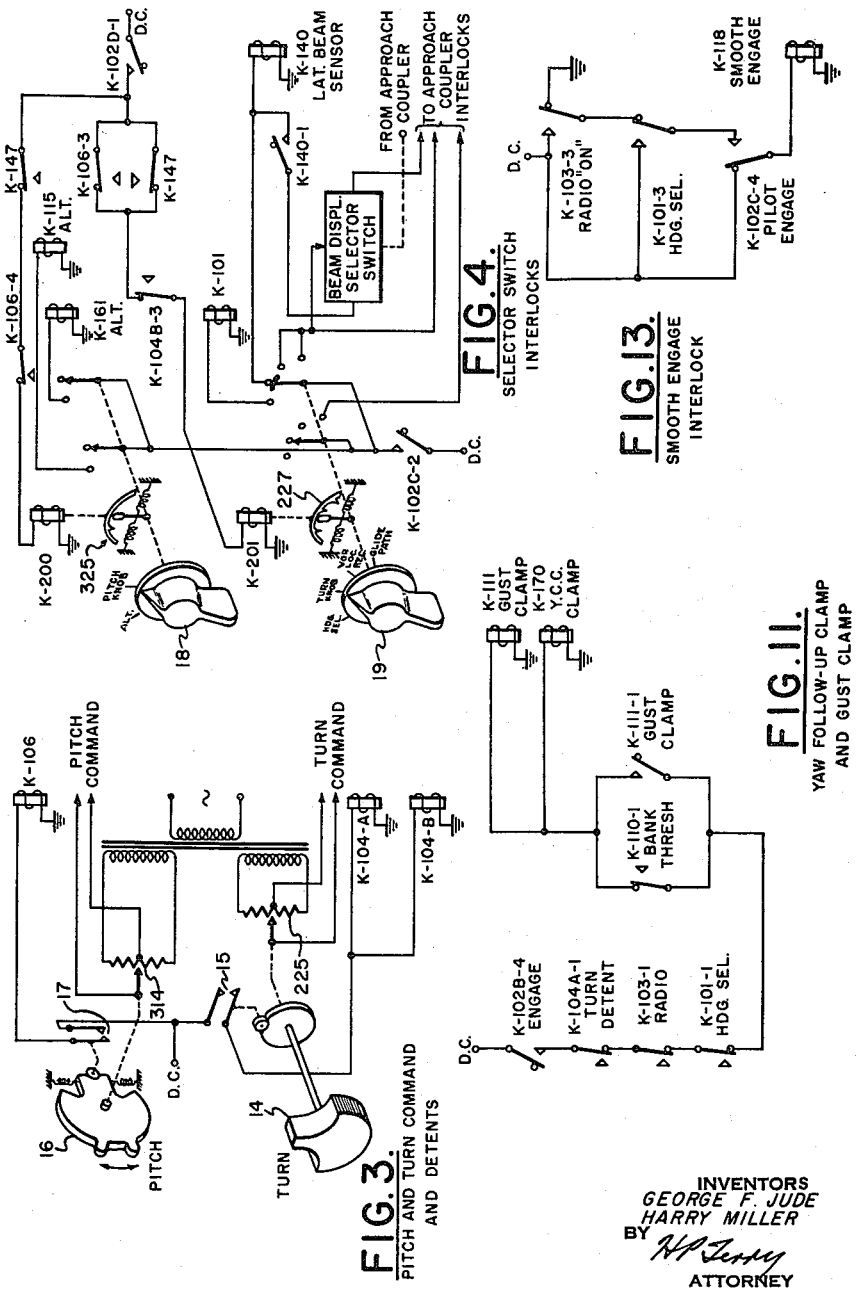

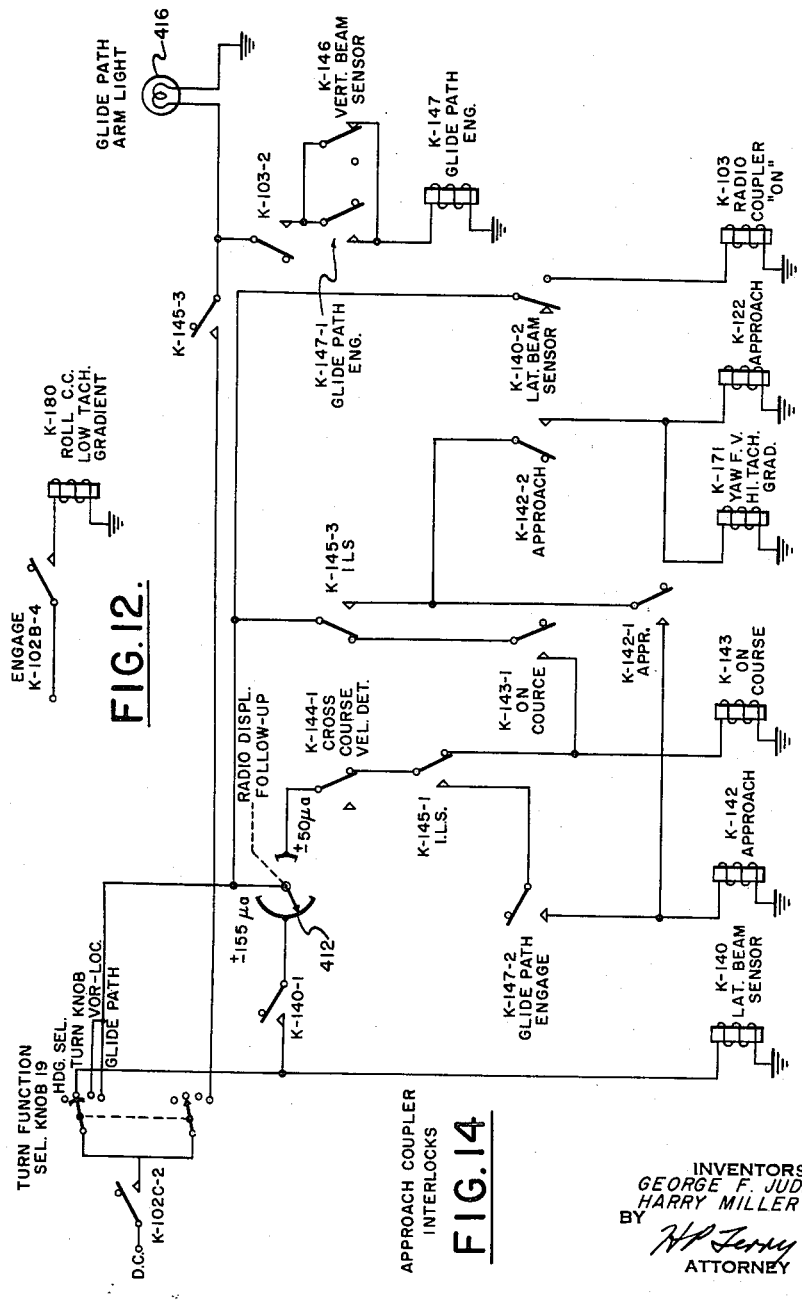

United States Patent Office 3,116,899
Patented Jan. 7, 1964

3,116,899
AIRCRAFT AUTOMATIC PILOT
George F. Jude, Phoenix, and Harry Miller, Scottsdale, Ariz., assignors to Sperry Rand Corporation, a corporation of Delaware
Application Dec. 12, 1960, Ser. No. 75,432, now Patent No. 3,079,109, dated Feb. 26, 1963, which is a division of application Ser. No. 813,097, May 14, 1959, now Patent No. 2,998,946, dated Sept. 5, 1961. Divided and this application Apr. 27, 1962, Ser. No. 190,629
5 Claims. (Cl. 244—77)

The present invention relates generally to improvements in automatic control systems for aircraft and more particularly to an automatic pilot for aircraft of the character set forth in copending parent application Serial No. 571,813 filed March 15, 1956, now Patent 3,007,656 for Aircraft Automatic Pilots, and the present application constitutes a continuation-in-part of that application. The present application contains a more detailed disclosure of the automatic pilot of the referenced parent application and is directed to improvements not specifically disclosed therein. The present application is also a division of patent application Serial No. 75,432 filed December 12, 1960, now Patent No. 3,079,109, in the names of George F. Jude and Harry Miller which in turn is a division of patent application Serial No. 813,097 filed May 14, 1959 and issued September 5, 1961 as Patent No. 2,998,946 in the names of George F. Jude and Harry Miller. All of said applications being assigned to the present assignee.

The various objects and feature of the improved automatic pilot of the present invention will become apparent from the following description of the preferred embodiment thereof taken in connection with the accompanying drawings, wherein, FIGS. 1A, 1B and 1C together illustrate the present automatic pilot in block diagram form; and FIGS. 2 through 14 are schematic wiring diagrams of the interlock circuits employed for switching the automatic pilot from one mode of operation to another in response to operation of manually controlled selector switches, maneuver command switches, and the like. For the reader's convenience, the general function of each of the separately illustrated interlock circuits are suggested by a figure title.

The following specification will be divided into sections in accordance with the various modes of operation available to and selectable by the human pilot. Generally these modes are Off or Disengage, Yaw Damper, Autopilot Engage, Manual Maneuver, and Path Control. Submodes of operation under the latter are further available such as Altitude Control, Radio Guidance (VOR/LOC), and Approach (Glide Path). For an illustration of the outward appearance of the pilot's control whereby the foregoing modes of operation may be selected, reference may be made to FIG. 7 of the above-identified parent application. During the description of the autopilot in its various modes of operation, the functioning of the interlock circuits, which in some cases automatically changes the mode of operation of the autopilot and which also prohibits incompatible signals from influencing pilot operation in any particular mode, will be set forth.

In the drawings, all relays are considered to be deenergized and all relay-controlled switches are accordingly illustrated in their deenergized positions. The switch contacts represented by an arrow or triangle denote those contacts which the switch armatures engage when their controlling relays are energized.

*General*

Referring now to FIGS. 1A, 1B and 1C, which are so arranged that they may be conveniently fixed together, it will be seen that the autopilot comprises generally three channels—a rudder channel 100, an aileron channel 200, and an elevator channel 300. Each of these rudder, aileron, and elevator channels may be broken down generally into three sections, namely, a short period stabilization section designated 101, 201 and 301, respectively, a long period stabilization section designated 102, 202 and 302, respectively, and a command section, the latter being further broken down into a manual input subsection 203 for lateral command and 303 for longitudinal command, and an external reference input subsection designated 400 for the lateral external command and 401 and 401' for longitudinal external commands.

Each of the three channels terminates in a substantially identical servomotor system 104, 204 and 304 for controlling the movement of the rudder, aileron, and elevator, respectively. These servomotor systems are the same as those described in detail in the above-identified parent application and will not be described in detail herein. Suffice it to say that they are velocity type servos, that is, during the normal operation of the automatic pilot the servos are caused to drive in a direction and at a rate proportional to the direction and magnitude of the input signal supplied thereto. This is accomplished by means of a rate generator driven by a servomotor whose output is fed back to the input of a high gain servo amplifier in opposition to the control signal applied to the amplifier. It will be noted that there is no position feedback during normal operation. The aircraft loop is closed by means of direct measures of craft angular acceleration, i.e. the surface deflection is controlled by the angular acceleration such deflection produces on the aircraft. Such arrangement provides substantially optimum control of the aircraft under all flight conditions. As will be described below, during the Disengage mode of operation, servomotor position information is required and for this purpose a synchro is clutched to the motor output in this mode. The elevator servo system includes a trim tab control system 304' for operating the trim tab of the aircraft for automatic trim purposes as also described in the parent application.

As in the parent application, automatic short period stabilization of the aircraft about each of the craft's primary axes while under control of the automatic pilot is provided by a pair of linear accelerometers spaced a distance apart along each axis and their combined outputs are so connected that a signal is produced which is proportional to the angular acceleration of the line joining the accelerometers about an axis at right angles to such line. Also, as in the parent application, one of the accelerometers in the yaw and pitch channel is mounted as near as possible to the C.G. of the aircraft and its output isolated in such a manner from its companion accelerometer that such output is a measure of the lateral and vertical linear accelerations of the aircraft, respectively. The manner in which the accelerometers are mounted in the aircraft and electrically connected is illustrated in detail in the parent application. In the present application, reference character 105 designates the forward yaw accelerometer and 106 designates the C.G. lateral accelerometer, the output of the latter being combined with the output of the former to provide the yaw angular acceleration signal, and the output taken alone constituting the lateral acceleration signal. Similarly, reference characters 305 and 306 designate respectively the forward pitch accelerometer and the C.G. vertical accelerometer respectively, the output of the latter being combined with the output of the former to provide the pitch angular acceleration signal, and the output of the latter alone supplying the vertical acceleration signal. In the roll channel, reference characters 205 and 206 designate respectively the upper and lower roll accelerometers, the combined output of which provides a measure of the angular acceleration of the craft in roll, i.e. about the craft fore-and-aft axis.

The long period displacement stabilization of the craft about its primary axes is provided by a vertical gyro 6 which supplies roll attitude data from output 207 and pitch attitude data from output 307. This vertical gyro may be a conventional gyro having, for example, liquid levels for maintaining the spin axis thereof slaved to gravity vertical. The gyro may also be provided with a quick erecting device operable when the pilot is initially turned on. Furthermore, it may be provided with suitable means for cutting out its erection under conditions where the effect of gravity vertical has been displaced due to craft accelerations. A schematic representation of a vertical gyro suitable for use herein is illustrated in the parent application.

Long period displacement stabilization is provided in the present automatic pilot by a directional gyroscope 107 which may be suitably slaved to the magnetic meridian. This gyro may likewise be equipped with quick erection devices and means for cutting off its slaving during periods of flight, wherein accelerations may affect the magnetic data sensor to which the gyro is referenced. In the absence of external commands, the attitude displacement signals provided by the vertical and directional gyros are applied unmodified to the surfaces of all systems as will become apparent below.

All external commands applied to the automatic pilot are supplied to the servomotor systems through command computers which function generally to smooth the input command signal so that abrupt transients are eliminated or in some modes as electro-mechanical time integrators. Thus, commands effecting movement of the craft in the vertical direction are applied to the elevator servo system through a pitch command computer 308, and commands effecting lateral movement of the craft, i.e., turns, are supplied to the aileron surface servomotor system through a roll command computer 208. A yaw command computer 108 is operable to follow-up on the directional gyro output during turn commands.

Pitch commands to the autopilot may be applied from three sources; a pilot-controlled pitch-rate command 309, displacement of which from a detent position commands a rate of change of pitch attitude whereby the response of the craft to such command is identical to that which would normally occur by the pilot's moving his control column. The second external pitch command is supplied by an altitude control 310, the details of which are illustrated in copending application Serial No. 571,788 filed March 15, 1956, for Longitudinal Axis Control System for Aircraft, and assigned to the same assignee as the present application. The third source of pitch command signal is the glide slope receiver 311 which supplies signals proportional to the displacement of the craft from the radio-defined glide path to the radio coupler 400 which converts the output of the receiver 311 to signals acceptable by the automatic pilot. It should be noted that the altitude control 310 and glide slope control 311 constitute apparatus for defining a flight path in the vertical plane which the aircraft is caused to follow.

Turn commands for the automatic pilot may be supplied from three sources. A pilot's turn knob 209 which, like the pitch knob 309, provides an output which commands a rate of turn proportional to the sense of displacement of the turn knob from its detent position. Again, the craft response to such command is identical to that which would occur upon turning of the pilot's wheel. The second turn command source is a pilot's magnetic heading selector 210. Through this command the pilot may select any desired magnetic heading and the craft will smoothly turn to and thereafter maintain the magnetic heading so selected. The third source of turn command is the output of a VOR/LOC radio receiver 211 which, like glide path receiver 311, provides a signal in accordance with the displacement of the craft from a radio defined course. The output of the lateral receiver 211 is modified, in a manner to be fully described below, in radio coupler 400., the output of which is applied to the automatic control system to cause the craft to approach and thereafter maintain that radio beam which is tuned in on the receiver.

While there is no main Off-On switch for the autopilot, it is effectively turned on by closure of three circuit breakers. These circuit breakers are shown in FIGS. 2 and 5. An instrument circuit breaker labeled "Inst. CB," an autopilot circuit breaker labeled "APCB," and a yaw damper circuit breaker labeled "YDCB." As illustrated, closure of the instrument circuit breaker serves to energize the vertical gyro and its associated quick erection system as well as to energize other components of the autopilot requiring fixed phase A.C. Similarly, closure of the autopilot circuit breaker supplies energization current for the roll and pitch accelerometer pairs as well as other component excitation such as roll and pitch servo fixed phase energization, roll and pitch command computer fixed phase energization, etc. At the same time, the autopilot circuit breaker controls an undervoltage sensor which, upon a loss or dropping of A.C. power below a predetermined minimum, serves to de-energize relay K–120 which automatically disengages the roll and pitch servo systems from their respective control surfaces. Closure of the yaw damper circuit breaker supplies excitation current for the yaw accelerometer pair as well as other component excitation necessary for yaw damper operation; for example, energization of the rudder servo system fixed phase supply. The yaw damper circuit breaker through rectifier $R_1$ supplies D.C. voltages to the autopilot and yaw damper engage interlock circuits, the operation of which will be described simultaneously with the description of the autopilot in its various modes of operation. Of course, the autopilot may be completely disabled by opening all of these three circuit breakers.

*Disengage Mode*

With all of the pilot circuit breakers closed but the servos disengaged, all the sensors are operative to detect movement of the craft about its primary axes; the yaw, roll and pitch command computers 108, 208 and 308 are all placed in follow-up on the reference signals provided by displacement gyros, i.e., the directional gyro 107 and vertical gyro 6; and the surface servo systems are placed in position follow-up on any signals applied to their input amplifiers. Thus, at any time during the disengage mode the human pilot may place the aircraft in the engage mode of operation without abrupt transients. The disengage mode is automatically instituted by placing the servo engage switch, schematically illustrated at 9 in FIG. 2, in its "Off" position. In this position selector switch arms 112, 212, and 312 terminate on grounded contacts and arm 10 terminates on an open contact. Under these conditions the rudder, aileron and elevator engage solenoids RES, AES and EES are de-energized and the clutches controlled thereby are open. It will be noted that the direct link between the engage switches and the engage solenoids establishes an important safety feature in that actuation of the engage switch to its off position immediately opens the circuit to the solenoids, thereby immediately and positively disengaging the servos should an emergency arise.

As stated, the servos are placed in position follow-up on any input signal to the servo amplifier during the disengage mode. This is accomplished through rudder, aileron, and elevator engage synchro solenoids RSS, ASS and ESS which remain deenergized since the switch 10 is on an open terminal and the main autopilot engage solenoid K–102D and yaw damper solenoid K–128 are both deenergized, thereby opening switches K–102B–1, –2, –3 and K–128–2. Deenergization of these solenoids establishes a direct connection between rudder, aileron and elevator servomotors and position synchros 113, 213 and 313, respectively. Since, in the disengage mode, pilot engage relay K–102D and yaw damper engage relay K–128 are both deenergized, switch K–102D–1 is open and relay K–102A is likewise deenergized which, in turn, causes the roll command computer 208 and the pitch command computer 308 to be placed in follow-up on the roll and pitch gyro signals through operation of switches K–102A–1 and K–102A–2. Similarly, the yaw command computer 108 is caused to follow-up on the directional gyro signal through the operation of yaw clamp relay K–170 which is normally energized in the engaged modes. Thus, yaw clamp relay switch K–170–1 is closed by virtue of open contact of engage switch K–102B–4 (FIG. 11) energizing the yaw follow-up motor.

With the command computers 108, 208 and 308 in their follow-up mode, the tachometer gradients are suitably changed so that the follow-up is rapid. The roll tachometer gradient is changed by virtue of roll follow-up low tachometer gradient deenergized relay K–189 (FIG. 12) and its associated switch K–189–1 (FIG. 1B). Similarly, pitch follow-up tachometer gradient deenergized relay K–190 (FIG. 7), through its associated switch K–190–1, places the pitch follow-up 308 in fast follow-up on the vertical gyro pitch signal by virtue of deenergized engage relay K–102D. The yaw command computer is normally in fast follow-up. However, it is placed in slow follow-up during coupling to ILS beams as will be described hereinafter.

Also, in the disengage mode, disengage relay switch K–102A–3 operates to short out any signal accumulated by the roll integrator 110.

Yaw Damper

In the yaw damper mode of operation of the autopilot of the present invention, the aircraft is under the manual control of the pilot and the yaw damper portion of the automatic pilot only provides damping of yaw motions of the craft. The yaw damper is especially designed to damp out any "Dutch Roll" tendency of the airplane during manual flight, a condition which is inherent in most modern aircraft having severely swept wings. The yaw damper is so designed that the human pilot does not normally known that the yaw damper is operating. In pilot commanded turns, however, he may be conscious that the yaw damper is helping him since he need not apply any rudder pedal to coordinate his commanded turns. All he need do is to turn his aileron control wheel in the direction it is desired to turn and in an amount dependent upon the desired turn rate. The manner in which this is accomplished will become evident as the description of the yaw damper mode continues.

To institute the yaw damper mode of operation, the pilot moves his servo engage switch 9 to the Yaw Damper position (FIG. 2). It will be noted that rectifier 8 supplies two D.C. voltages. One supply is fused as by fuse F and the other is not. The fused D.C. energizes relay K–500 which serves as a D.C. voltage sensor and normally holds its associated switch K–500–1 in its energized or down position. The non-fused supply energizes only that portion of the autopilot and yaw damper engage interlock circuit which is necessary for yaw damper operation. If a failure in the automatic pilot interlock channels blows fuse F, the non-fused supply is available to operate the yaw damper. With switch 9 in its yaw damper position, fused D.C. is applied through the pilot's and co-pilot's emergency release buttons P and CP to a yaw damper engage relay K–128 and an engage switch holding solenoid 12. The function of the engage switch holding solenoid 12 is to provide a mechanically releasable lock on the engage switch 9 such that with the switch in the yaw damper position, should the solenoid become deenergized, the engage switch will snap automatically through spring action to its off position, thereby placing the autopilot in the disengage mode. Energization of yaw damper relay K–128 serves to close its associated switch K–128–2, which energizes the rudder engage solenoid RES through switch arm 112 to thereby engage the rudder servomotor with the aircraft rudder. Simultaneously, the rudder synchro solenoid RSS disengages the rudder synchro 113 from the servo system (FIG. 1C) so that the only feedback to the servo amplifier is that from the servo tachometer. Clutching of the rudder engage clutch serves to close rudder microswitch RMS, thus establishing a circuit which will energize the engage switch holding solenoid 12. If for some reason the rudder engage solenoid does not function, or should any other malfunction occur which would cause a declutching of the rudder servomotor from the surface, microswitch RMS opens thereby deenergizing engage switch holding solenoid 12 and causing switch 9 to drop to its off position.

The foregoing interlock operation places the rudder servo system under the control of yaw accelerometers 105 and 106, as well as the roll accelerometers 205 and 206. The two basic sensors for yaw damping are the yaw accelerometers. Their combined outputs, proportional to yaw angular acceleration, are applied to an amplifier demodulator 114, the D.C. output of which is applied in two branch circuits, one containing a lead circuit and filter 115 (shown in detail in the pitch channel 301) which functions as a blocking network and noise filter in the acceleration signal due to power supply fluctuations and/ or to body-bending effects. The other branch leads the acceleration signal to a lag-lead filter 116, the lag portion of which serves to develop a rate component therefrom, while the lead portion thereof serves to again suppress noise and to compensate for any body-bending effects. The details of these circuits are shown in the pitch channel. The angular acceleration and rate terms are combined and modulated in demodulator 117 and the resultant output is applied to the input of the rudder servo amplifier 118 which is a very high-gain amplifier as described in the parent application. After amplification therein, the signal is used to control the rudder servomotor 119 which drives the rudder at a rate proportional to the magnitude of the amplifier input by virtue of tachometer feedback from rate generator 120. Thus, angular accelerations of the craft about the yaw axis serve to drive the control surfaces at a rate proportional thereto, thereby producing a yaw acceleration of the craft in opposition to that produced by the disturbing moment which initially caused the angular acceleration. The rapid response of the surface to angular accelerations greatly increases the apparent inertia of the airplane, thereby minimizing attitude deviations in turbulent air.

As stated, through the use of additional signals, turns produced by the human pilot are coordinated through yaw damper operation. Long term or steady state coordination is provided by C.G. located accelerometer 106. Its output is parameter controlled as at 109, rendered operative in the yaw damper mode by relay switch K–128–3, and is then applied to demodulator 121, the D.C. output of which is smoothed as by lag filter 122 and remodulated at 123. The output of the demodulator is applied through a direct connection to the rudder servo system input and also to yaw damper integrator 124 whose output, in turn, is combined with the angular acceleration signal and applied to the servo amplifier 118. The direct feed of lateral acceleration to the rudder servo together with the yaw damper integrator output serves to provide the long term or steady state coordination during human pilot initiated turns. Short term or transient miscoordination is substantially eliminated by driving the rudder as a function of the rate of roll of the aircraft. In other words, coordination is provided during turn entry and turn exit or in the event of roll producing gusts during the turn. The roll rate signal is developed as follows. The upper and lower accelerometers 205 and 206 provide a signal proportional to roll angular acceleration as in the parent application, this signal being amplified and demodulated at 214, the D.C. output of which is branched to lead circuit and filter 215 and lag-lead filter 216. Lead circuit and filter 215 serves as a blocking network and noise filter as in the rudder channel, while lag-lead filter 216 serves to derive a rate component from the acceleration signal and likewise to suppress noise as above. The roll rate component is parameter controlled at 216' and combined with the angular acceleration signal in demodulator 217, the output of which is applied to the input of rudder servo 18 through the yaw damper integrator 124 after being parameter adjusted at 217'. Through the operation of integrator 124, the roll signal applied to the rudder servo amplifier varies in accordance with the rate of roll of the aircraft. The parameter controlling the roll rate term provides transient coordination under all flight configurations.

Since the aileron servo is disengaged, the roll angular acceleration signal will be ineffective in the aileron channel. It will be noted in regard to the interlocks in the yaw damper mode that no important precautions need be taken prior to engaging the rudder to its servo system inasmuch as it is only the higher derivative craft movements that are being damped out. In other words, the yaw damper mode may be instituted at any time, no matter what the aircraft's attitude might be at that time.

*Autopilot Engage*

Before discussing the autopilot mode of operation of the autopilot of the present invention, it should be noted that those circuits operative in the yaw damper mode just described operate in an identical manner in the autopilot mode so that a description thereof will not be repeated.

In order to place the autopilot in the full autopilot mode, engage switch 9 is thrown to its Autopilot position, thereby moving switch arm 10 to its uppermost contact, establishing D.C. power at this point. However, before the full autopilot may be engaged, certain conditions must be satisfied. When all these conditions are satisfied and the pilot interlock loop is closed, the autopilot engage relay K–102D is energized, thereby permitting operation of the automatic pilot in all its possible modes of operation. The conditions which must be fulfilled are as follows. There must be sufficient D.C. power as determined by switch K–500–2 controlled from undervoltage relay K–500; the vertical gyro must be fully erected and operating normally as determined by switch K–302–1 controlled from quick erection relay K–302 (FIG. 5). Also, sufficient A.C. voltage must be present in the system as determined by A.C. undervoltage sensor 7 and relay K–120 normally energized thereby. Switch K–120–1 determines if this conditon is satisfied before the pilot can be engaged. A further condition which must be fulfilled before pilot engage relay K–102D will be energized is that all autopilot automatic cut-off relays will be balanced, i.e., that there is no condition in the autopilot which would cause its automatic cut-off. The details of such automatic cut-off or safety monitor system are disclosed in copending application Serial No. 623,592 for Monitoring Device for Automatic Pilot Systems, filed November 21, 1956, in the names of H. Miller and R. H. Parker, now issued as Patent No. 2,973,927 dated March 7, 1961, and assigned to the same assignee as the present invention. For simplicity of illustration, these automatic cut-off relays have been illustrated generally by a suitably labeled block 13.

Also, the autopilot cannot be engaged at bank angles greater than 35°. Such condition is determined by bank detector relay K–114 (FIG. 1B). This relay is energized through the operation of the roll command computer 208 as, during the disengage mode, it follows up on the vertical gyro roll signal supplied by roll synchro 218 on vertical gyro 6 and synchro 219 on the roll computer output shaft. An extension of the roll computer shaft positions a switch arm 220 along an arcuate sector 221 which subtends an angle of 35° on each side of zero roll reference position. D.C. current is applied to the wiper 220 such that if the wiper is off the contact strip, bank detector relay K–114 is deenergized and switch K–114–1 (FIG. 2) will remain open, thereby preventing engagement of the pilot. Of course, if the bank angle is less than plus or minus 35°, switch K–114–1 is closed permitting pilot engagement, provided the other engaged conditions are fulfilled.

A still further condition which must be satisfied before the autopilot engage relay will become energized is that the manual pitch and turn controllers must be in their no command or detent position. This is accomplished in the engage interlock circuit for relay K–102D by normally closed relay switches K–104B–1 and K–106–1 which, in turn, are controlled by turn knob detent relay K–104B and pitch knob detent relay K–106, illustrated in FIG. 3. As shown in this figure, should the turn knob 14 be out of detent, switch 15 will be closed thereby energizing relay K–104B and opening engage interlock circuit switch K–104B–1. Similarly, should the pitch knob 16 be out of detent, swtich 17 will be closed and relay K–106 energized, thus opening K–106–1 in the engage interlock circuit (FIG. 2).

In the pilot engage interlock circuit of FIG. 2, the engage relay switch K–102C–1 is shown in parallel with the bank angle switch K–114–1 and the detent switches K–104B–1 and K–106–1. This switch is closed upon energization of the main pilot engage relay K–102D and serves to insure that subsequent operation of the bank angle and detent relays will not disengage the pilot.

With all of the foregoing conditions satisfied, the pilot engage relay K–102D is energized, which energization controls a number of parallel connected engage relays K–102A, –B, and –C through the closure of engage relay switch K–102D–1. Energization of K–102B closes ganged switches K–102B–1, –2 and –3 which, in turn, energize the rudder, aileron, and elevator synchro solenoids RSS, ASS and ESS to declutch the surface position synchros 113, 213 and 313 from the servomotor outputs and simultaneously, by virtue of switch arms 112, 212 and 312 being in their uppermost position, energize the rudder, aileron and elevator engage solenoids RES, AES and EES, thereby effecting direct connection from the servomotors to the control surfaces. It will be noted that if the craft had previously been in the yaw damper mode, the rudder synchro solenoid and rudder engage solenoids will remain energized through the operation of engage switch K–102B–3, the yaw damper relay switch K–128–2 having been open upon switching from the yaw damper to the autopilot mode. With the rudder, aileron and elevator microswitches RMS, AMS and EMS all closed, a circuit is established to engage switch holding solenoid 12. Thus, should any malfunction occur which would cause any of the servo clutches to separate, the affected microswitch will open, deenergizing engage switch holding solenoid 12 and allowing the engage switch 9 to drop to either its yaw damper position or off position, depending upon which servo experienced the failure. The engage switch is so designed that, should the malfunction not affect the yaw damper elements, the engage switch will automatically drop to yaw damper position and remain there. This is accomplished in part by separate energization of the engage switch holding solenoid 12 through yaw damper contact on switch 10.

Closure of relay K–102A also serves to place roll command computer 208 and pitch command computer 308 in their engage positions wherein they will respond to any input commands thereto. Through the operation of K–102A, roll integrator 11 is also rendered responsive to any input signal applied to its input by closure of switch K–102A–3. The tachometer gradients of the roll command computer 208 and the pitch command computer 308 are adjusted for their normal autopilot operation through energization of relays K–180 (FIG. 12) and K–190 (FIG. 7) and closure of engage relay switches K–102B–4 and K–102D–1, respectively.

It has been described above that the servos cannot be engaged if the aircraft is in a banked attitude of greater than plus or minus 35°. If the autopilot is engaged at bank angles less than 5°, the craft will automatically roll to level flight and the steady state heading, i.e., the compass heading, at engagement will be maintained. This is accomplished as follows. Since during the disengage mode or yaw damper mode the roll computer 203 followed up on the vertical gyro signal, the roll attitude of the aircraft exists in synchro 219 (FIG. 1B) and the sine of this bank angle is present in resolver 222, also positioned by the roll command computer shaft. Therefore, upon engagement through switch K–102A–1, the stored bank signal is applied to the input of the roll command computer and drives the latter to zero the signal, and in so doing causes aileron operation through gyro synchro 218 and roll command computer synchro 219 to roll the aircraft to a level attitude.

Referring now to FIGS. 5 and 1B, a pair of liquid level switches 223 are provided and are responsive to lateral accelerations of the craft such as would be produced by a bank angle of about 5°. These switches are arranged on the gimbal of the roll gyro as represented by the dotted line connection in FIG. 1B and are normally maintained level by gyro rigidity and hence are very sensitive to lateral accelerations. These switches serve to close a circuit from the instrument circuit breaker through a suitable transformer and bridge rectifier 224 to ground, thus energizing erection cut-off relay K–304, energization of which serves to cut-off the erection on the vertical gyro until the bank angle of the craft is less than 5° roll, i.e., the lateral acceleration sensed by the switches drops below a predetermined value. Energization of erection cut-off relay K–304 also energizes bank threshold relay K–110 through action of switch K–304–1 (FIG. 6). If, however, the bank angle is under 5°, gyro erection stays on and the bank threshold relay K–110 remains deenergized. Referring now to FIG. 11, it can be seen that even with the pilot engage relay closed, yaw comand computer 108 is clamped through the deenergization of bank threshold relay switch K–110–1, thereby allowing yaw command computer relay K–170 to be energized, which disconnects the output of the yaw follow-up amplifier with its follow-up motor. Also, as shown in FIG. 11, gust clamp relay K–111 is also energized, thereby supplying a heading reference signal to the rudder servo system through gust clamp switch K–111–1 and to the roll command computer through gust clamp switch K–111–2. In the foregoing manner, if the pilot is engaged at less than 5° bank angle, the craft will roll level and maintain the heading obtaining at engagement.

If the autopilot should be engaged at greater than 5° bank angle, the craft will make a coordinated maneuver to level flight and maintain the heading achieved when the bank angle drops below 5°. This roll to level flight is accomplished in the same manner as before, but while the aircraft is at a bank angle greater than 5° the bank threshold detector K–110 will be energized due to the energization of erection cut-off relay K–304 as a result of closure of one or the other of liquid levels 223. Energization of the bank threshold detector opens the switch K–110–1 and deenergizes yaw computer clamp relay K–170, placing yaw follow-up 108 in follow-up on the signal from the directional gyro 107. Simultaneously, gust clamp relay K–111 is likewise deenergized so that no heading reference signal is applied to the rudder servo nor to the roll command computer 203. Thus, as the roll command computer 203 reduces the bank angle signal in resolver 222 toward zero, the directional gyro remains in follow-up until the bank angle drops below 5°, at which time the yaw command computer 108 is clamped as described above.

Upon engaging the flight control system, the pitch attitude existing at the time of engagement is maintained and the craft may be returned to level flight by operating pitch command knob 16 or by selecting the altitude control mode. If the autopilot is engaged at 0° pitch attitude with the altitude control off and the pitch knob in detent, pitch follow-up clamp relay K–191 (FIG. 7) is energized and the pitch command computer 308 is clamped. The output of the pitch command computer synchro 317 is zero at this time by virtue of its following up on the vertical gyro signal during the disengage mode and any deviations from level flight after engagement will cause the craft to be brought back to level flight due to the direct connection from vertical gyro pitch synchro 318 to the elevator servo system 304. Also, if the autopilot is engaged in, say, a pitch down attitude, no pitch signal will be supplied to the elevator servo system, again due to the follow-up action of pitch command computer during the disengage mode.

The autopilot is now fully engaged and is conditioned for acceptance of any maneuver command signals generated either by manually inserted commands through the turn and pitch knobs 14, 16 or through externally inserted commands, i.e., radio commands or altitude control commands.

*Autopilot Short Term Stabilization*

With the automatic pilot engaged, short term attitude stabilization is provided by the yaw, roll and pitch angular accelerometer signals produced by the yaw, roll and pitch accelerometer pairs. The function of the roll and pitch accelerometer pairs in stabilizing the craft against short period disturbances is exactly the same as that previously described with respect to the yaw channel operating the yaw damping mode and a detailed discussion thereof will not be repeated. As stated, the upper and lower roll accelerometer signals are combined so as to produce a resultant signal proportional to the angular acceleration of the craft, the signals being modified as previously described and applied to the aileron servo system 204 where a surface rate proportional to the measured acceleration is produced to thereby stabilize the craft against short period roll disturbances. The pitch angular accelerations are suppressed in the same manner. However, as in the yaw channel, the accelerometer 106 mounted at the C.G. of the craft supplies a separate signal proportional to the vertical acceleration thereat. It will be noted in FIG. 1C that the details of the lead filter and lag-lead filter are shown in detail, and it should be understood that the corresponding filters in the other accelerometer channels are substantially identical, the functions thereof having been previously described in connection with the yaw damper mode of operation.

*Manual Maneuver Commands*

Assume now that the craft is flying straight and level and it is desired to manually maneuver the craft about its pitch axis. For pitch maneuver commands by the human pilot, pitch function selector knob 18 must be in its Pitch Knob position (FIG. 4). With the pitch function selector knob 18 in this position, the pitch attitude of the craft may be changed by rotation of spring centralized pitch rate command knob 16. Rotation of this knob out of detent closes switch 17 and energizes relay K–106 (FIG. 3) which, in turn, deenergizes pitch follow-up clamp relay K–191 (FIG. 7) by opening of switch K–106–5 to thereby unclamp pitch command computer 308 (FIG. 13) by closing of switch K–191–1. At the same time, a pitch command signal proportional to the sense and magnitude of the displacement thereof is generated through potentiometer 314, the magnitude and sense of this signal being in turn proportional to the desired sense and rate of change of pitch attitude of the craft. This signal is applied through now closed pitch detent relay switch K–106–2 to the input of pitch follow-up amplifier 308 which energizes pitch follow-up motor 315 so that it drives in the direction and at a rate proportional to the direction and magnitude of the pitch command signal by virtue of the speed feedback voltage from generator 316. It will be noted that in this mode relay K–190 (FIG. 7) is energized and relay switch K–190–1 is moved to its high tachometer gradient position, thereby decreasing the rate at which the follow-up motor can operate as compared with its rate in the disengage mode, that is, to a rate consistent with craft response characteristics to input commands. It will be further noted that the motor 315 will continue to drive until the pitch command signal is reduced to zero as by manually returning knob 16 to detent. Rotation of the pitch command computer synchro 317 with respect to vertical gyro synchro 318 will produce an error signal which is supplied to the elevator servo system 304 to thereby produce a pitch rate of the aircraft proportional to such error. In order that the elevator deflection producing the commanded rate is not initially opposed by the angular pitch acceleration which normally tends to oppose any rotation of the craft about its pitch axis, the rate of change of the pitch command signal as measured by follow-up generator 316 and hence a pitch acceleration term is applied through switch K–112–3 (deenergized in the manual pitch command mode) and a suitable isolation transformer 319 to the input of amplifier demodulator 320 in the angular acceleration output channel in opposition to the angular acceleration signal, thereby bucking out any pitch angular acceleration signal which would oppose the pitch command.

When the desired pitch attitude of the craft has been achieved, the pilot releases or re-centers the pitch knob 16, thereby zeroing the pitch command signal from potentiometer 314 and closing pitch detent switch 17. Thus, pitch detent relay K–106 is deenergized and K–191 energized to thereby clamp pitch command computer 308 at the position it then had. The vertical gyro thereafter stabilizes the aircraft at the newly established pitch attitude. The craft may be returned to level flight attitude by an opposite sequence of operation of the pitch command knob 16, or, if desired, by rotating pitch function selector switch 18 to the ALT position. The altitude control mode will be described below.

As stated, two types of manual turns may be accomplished with the autopilot of the present invention; by manual turn rate commands inserted through operation of turn rate controller 209 and by preselected heading commands through heading selector 210. The selection of these modes is accomplished through the pilot's turn function selector switch 19 to either the Turn Knob or HDG SEL positions, in each of which interlock circuits are established whereby command turns from these sources are supplied to the autopilot.

As shown in FIG. 4, the turn knob position of function selector switch 19 is the normal position, the knob being spring centered to this position. With the knob 19 in this position, relay K–140 is energized, conditioning the system for additional operation in either of the radio modes to be hereinafter described. Turn rate commands are instituted through turn knob 14, rotation of which out of detent position closes detent switch 15 and energizes relays K–104A and K–104B. Simultaneously, a voltage is generated across potentiometer 225 which is proportional to the magnitude and sense of such displacement, which voltage is in turn proportional to the magnitude and sense craft rate of turn which it is desired to make. Energization of relay K–104A serves to unclamp the yaw command computer 108 through the opening of switch K–104A–1 (FIG. 11) with the resulting deenergization of yaw computer clamp relay K–170 and gust clamp relay K–111. Thus, as the aircraft turns in response to the turn command signal, the yaw command computer 108 follows up on any signal from the directional gyro 107. Energization of relay K–104B closes switch K–104B–4 (FIG. 5) which serves immediately to cut off the erection controls of the vertical gyro and any slaving controls of the gyromagnetic compass system of which the directional gyro 107 and heading selector 210 may form a part. Erection cut-off relay K–304 also, through switch K–304–1, energizes bank threshold relay K–110 (FIG. 6) which, in turn, opens switch K–110–1 in parallel with the gust clamp relay switch K–111–1 in the yaw command computer clamp and gust clamp circuit (FIG. 11). Function of these switches will be described hereinbelow. Relay K–104B also closes switch K–104B–2 (FIG. 1B) which connects the turn command signal to the roll command computer 208.

The turn rate command signal applied to roll command computer 208 produces a rotation of roll computer motor 226 at a speed determined by generator 227 and through an angle proportional to the sine of the bank angle required for the rate of turn commanded. Synchro 219 thus biases or shifts the bank angle reference provided by synchro 218 on the vertical gyro 6 through an angle in accordance with the rate of turn command. The signal from synchro 219 is applied to the aileron servomotor and causes the craft to bank to that bank angle and therefore to turn at a rate corresponding to that commanded. Of course, short period roll stabilization continues to be supplied by the upper and lower accelerometers 205 and 206. Any initial opposition to the roll command by the roll accelerometers and the inherent lag in servo response produced thereby is not objectionable in this channel. As will become evident later on, this lag is actually accentuated in other modes of operation. As explained above, the roll acceleration signal is applied through yaw damper integrator 124 to apply rudder in a sense to oppose any adverse yaw due to the roll rate. As the craft turns in response to the bank angle, the yaw command computer 108 follows up on the directional gyro 107. However, since gust clamp relay has closed switch K–111–1, any heading error signal exceeding the follow-up capacity of the yaw command computer 108 is applied to the rudder servo system 100 to thereby provide heading stabilization during the turn. Short and long term turn coordination is supplied through the C.G. mounted accelerometer 106 operating directly into the rudder servo system and through electronic integrator 124 into the rudder servo system, respectively.

In order to prevent any loss in altitude during the turn, due to the decrease in vertical lift of the wings by banking of the craft, a lift compensation signal dependent upon bank angle is inserted into the pitch or elevator channel of the autopilot. It can be shown that the precise mathematical value of this compensating signal may be very closely approximated by the expression $(1-\cos \phi)$ where $\phi$ is the bank angle. Thus, a further winding on resolver 222 rotated by the roll command computer motor 226 provides a signal proportional to $\cos \phi$. This signal is applied as an input to a $(1-\cos \phi)$ computer 323 where it is combined with a fixed constant voltage. The resultant signal is applied through two branches to the pitch channel of the autopilot through a suitable isolation transformer 324. In one branch the signal is parameter controlled as at 326 in accordance with the reciprocal of dynamic pressure $q$ since the value required for lift compensation varies with air speed. This lift compensation signal is applied to the input of the elevator servo system 304 and produces an elevator deflection such as to tend to maintain the altitude of the craft constant during the turn.

When it is desired to stop the turn, the pilot rotates the turn knob back to its detent position, the craft immediately rolling to level flight and, through interlock circuits, it will fly to and maintain the heading obtaining when the bank angle has decreased to below 5°. Return of turn knob 14 to its zero position opens detent switch 15 and deenergizes relay K–104A and K–104B; K–104B–2 and –B–4 serving, respectively to sever the connection between the turn command 209 and the input to the roll command computer 208 (FIG. 1B) and to place the erection control relay K–304 under the control of liquid levels 223 (FIG. 5). Also, K–104A–1 establishes a connection from the D.C. supply to bank threshold relay switch K–110–1 and gust clamp relay switch K–111–1 (FIG. 11). Therefore, as soon as the bank angle drops to 5°, erection relay K–304 will become deenergized due to the leveling of the liquid levels 223. At the same time, bank threshold relay K–110 will be also deenergized, again deenergizing yaw command computer clamp K–170 and gust clamp K–111. Thus, the yaw command computer 108 is again clamped and the directional gyro 107 provides it heading stabilization signal to the yaw and roll channels of the autopilot through gust clamp relay switch K–111–2 (FIG. 1B) to maintain the craft in straight and level flight at the heading then obtaining.

If when the craft is rolling out of the bank maneuver and the bank angle drops below 5°, but a sudden gust should cause the craft momentarily to increase its bank angle over 5°, the switching sequence above described would again unclamp the yaw command computer causing to follow up on any directional gyro signal. Since a gust is normally of generally short duration, such momentary operation of yaw command computer is undesirable and means have been provided for allowing the yaw command computer to be unclamped only upon commanded turns rather than upon a gust produced bank angle. Upon gust clamp relay K–111 becoming energized, switch K–111–1 (FIG. 11) in parallel with bank threshold switch K–110–1 closes, maintaining a direct D.C. path to the gust clamp and yaw command computer clamp relays, even though bank threshold relay K–110 is energized due to a gust detected by liquid levels 223.

The craft is now back in straight and level flight, holding the heading defined by the directional gyro 107 and an altitude defined by vertical gyro 6. It will be noted in FIG. 4 that the manual turn knob mode takes precedence over any other mode of operation of the autopilot through the use of a suitable electromechanical holding latch 227 coupled with switch 19, the energization of which is controlled in dependence upon whether or not turn knob 14 is in or out of detent. For example, if knob 19 were in any position other than Turn Knob and the pilot turned turn knob 14, K–104B would become energized, closing switch K–104B–3 in FIG. 4 and energizing holding switch solenoid K–201, automatically centering selector knob 219 through its centralizing spring.

Command turns may likewise be made through the pilot's magnetic heading selector 210. The details of such a selector are shown in the above-identified parent application and particularly in FIG. 5 of that application. Through this type of turn control, the pilot may turn to any selected magnetic heading and the craft will smoothly bank up into a coordinated turn and then roll to level flight at the magnetic heading so selected. The normal procedure for making a heading type turn is to select the heading it is desired to fly on the heading selector 210 with the turn function selector knob 19 in its normal turn knob position. The signal so generated will wind up on open contacts of switches K–101–1 and –2 (FIG. 1B). Then, when it is desired to make the turn, the pilot merely turns the turn function selector knob to the HDG SEL position, the latter setting serving to institute the turn of the craft. In this manner, the desired heading may be preset and the actual turn of the craft instituted at any desired time thereafter, a feature which may be highly desirable, especially when holding in a stack preparatory to landing. Alternatively, the turn function selector knob may be set to heading select and the heading then selected on the selector 210, the craft smoothly following the heading as it is being selected.

As described in the parent application, setting of the selector 210 generates a signal in a synchro coupled with the heading indicator which is proportional to the difference between the actual heading of the craft and the desired heading so set. Switching of turn selector knob 19 to the heading select position energizes K–101 (FIG. 4) and supplies the heading error signal of heading selector 210 to an amplifier limiter 228 through switch K–101–1 (FIG. 1B). Also, switch K–101–2 closes a circuit between heading selector 210 and the roll integrator 11 whose output is combined with the heading error signal and applied to the input of amplifier limiter 228. The integrator serves, in the heading select mode, to prevent the aircraft from turning due to any persistent trim error which is reflected in a persistent heading error. It will be noted that the heading error signal from heading selector 210 is first passed through a transient integrator 229 for smoothing out any abrupt motion of the heading selector knob. Energization of relay K–101 also arms a smooth engage circuit 230 through switch K–101–3, relay K–118 (FIG. 13) and its associated switch K–118–1 (FIG. 1B). This smooth engage circuit functions through a capacitor-charge time type circuit to limit the speed with which the heading error signal is allowed to be applied to the roll command computer 208. This is especially desirable in the above-described preferred manner of making a heading select type turn when there might otherwise be a switching transient.

Inasmuch as the magnitude of the error signal from heading selector 210 may be very large; as for example when, say, a 180° turn is selected, and because a bank angle proportional to heading error is provided to the aileron servo system, the heading command signal is limited in limiter 228 to a magnitude such as not to command an excessive bank angle. As illustrated in FIG. 1B, the limits imposed on the bank angle may be varied, depending upon the mode of operation of the aircraft. These will be discussed later in connection with the radio guidance modes. The remainder of the operation of the autopilot in the heading select mode is exactly the same as that in the turn knob mode, particularly in regards to the yaw command computer clamping and unclamping and gust clamp operation.

*Flight Path Control*

In this section of the present specification will be discussed the operation of the autopilot under the influence of commands generated in accordance with departure of the craft from preselected or predetermined flight paths, that is, flight paths that are defined by such references as barometric data and navigational or other radio beams.

If it is desired that the autopilot control the aircraft to maintain a desired pressure altitude, function selector switch 18 is turned to the ALT position. As shown in FIG. 4, such switching will energize altitude control relay K–161 which serves to energize altitude control 310. In practice, relay K–161 is in the altitude control unit 310 and functions effectively to clamp a barometric altitude reference member, such as an aneroid bellows, in the position it had when clamped and any error in the altitude thereafter will produce a signal output from a suitable pick-off device proportional to such deviation. Switch 18 also energizes a second altitude control relay K–115 which, in turn, closes switch K–115–1 (FIG. 1B) thereby supplying the altitude error signal to the autopilot command circuits. Relay K–115 also controls switch K–115–2 (FIG. 9) which serves to energize vertical path relay K–112. Operation of this relay in turn opens opens switch K–112–1 (FIG. 7) to thereby deenergize pitch follow-up clamp K–191 and allow pitch command computer 308 to be responsive to any signal applied to its input amplifier.

At this point it should be stated that if the craft is in altitude control and the pilot wishes manually to change attitude, he need merely rotate the pitch command knob 16. This action will again close pitch detent relay K–106 which, in addition to putting in the pitch command as described above, also deenergizes a mechanical interlock relay K-200 which automatically returns the function selector switch knob 18 to its pitch knob position. Conversely, if the aircraft is in a climb or dive through pitch knob operation and it is desired to level out at a particular altitude, the pilot need merely switch the function selector switch 18 to its ALT position, such switching making the connections described above to hold the altitude at which the switch 18 was operated. The details of the altitude control system are disclosed in the above U.S. application Serial No. 571,788.

As will become evident, when the craft is placed in the altitude control mode, the signals controlling the elevator servo system include an altitude displacement error signal, a damping term derived from the integral of vertical acceleration, and an integral control term derived through integration of any persistent altitude error. In order for such integral terms to be derived, certain modifications in the pitch command computer 308 must be accomplished. It will be remembered that in the pitch maneuver command mode, the pitch command computer followed up rapidly on the pitch rate command signal. In the altitude control mode (as well as the glide slope mode to be described later), pitch command computer 308 has its gain changed to such an extent that it may operate as a long term integrator. Thus, when the altitude mode is selected through selector switch 18, certain interlocks are effected to make these changes in the pitch command computer. With selector switch 18 in its altitude position, altitude relay K-115 is energized through engage relay K-102C-2 (FIG. 4), thereby energizing vertical path relay K-112 through engage relay K-102D-1 (FIG. 9). Energization of K-112 opens switch K-112-1 (FIG. 7), thereby deenergizing relay K-191 and unclamping the pitch command computer 308. Since the pilot is engaged, K-190 is energized thereby increasing the amount of rate generator feedback signal to the input of the amplifier of the pitch command computer. Energization of K-112 also closes switch K-112-2 (FIG. 8) which, in turn, energizes solenoid MG-101. This solenoid functions to shift gears in the gear transmission 322 between pitch command computer motor 315 and its output synchro 317. In the manual pitch rate maneuver mode, a high speed gear reduction (for example 5000:1) is required so that the pitch command computer follows up rapidly on the pitch rate command signal. However, to perform as an integrator, the gearing between the pitch command computer motor 315 and output 317 must be a low speed gearing such that considerable rotation of the motor 315 will produce only a small rotation of output synchro 317 (for example 15000:1). Thus, operation of the selector knob 118 to its ALT position not only switches in the altitude control 310 but also, through the interlocks just described, conditions the pitch command computer 308 to operate as a long term integrator of any persistent altitude error.

For the purposes of the present application, the altitude control 310 supplies an output proportional to the displacement of the craft from some reference barometric altitude, this signal being applied directly through an amplifier, lag and limiter circuit 321 directly to the input of elevator servo system 304. The limiter serves to limit the magnitude of the pitch attitude commandable by the altitude error signal. This displacement signal is bucked by a signal from the vertical gyro synchro 318 through synchro 317 on the pitch command computer 308 in a suitable summing circuit. This signal provides short term altitude control which corrects for gusts and other disturbances. The lag serves to smooth the altitude error signal. Inertial path damping is provided in the present autopilot by a signal proportional to normal accelerations of the craft, i.e., parallel to direction of gravity, as detected by the C.G. or vertical accelerometer 106 (FIG. 1C), this signal being applied through a highpass or lead filter to the input of the pitch command computer 308 where it is integrated and applied to the pitch servo system as an altitude rate term. However, with the airplane in a turn, the C.G. or vertical accelerometer 106 would sense the centrifugal acceleration produced by the turn and therefore would tend to nose the craft down in order to reduce such acceleration. Since the vertical accelerometeer obviously cannot sense the difference between normal acceleration and a vertical acceleration component due to centrifugal force, the other branch of the output of the 1—cos φ computer is applied in the output of vertical accelerometer 106 in such a sense as to cancel only that component of vertical acceleration produced by turning, i.e., the centrifugal force component. However, since the 1—cos φ signal is an approximation, a small vertical acceleration signal may exist at high bank angles. The difference between the normal acceleration signal and the 1—cos φ signal is therefore applied to the integrator or pitch command computer 308 through a highpass or lead filter to thereby remove any longer period or steady state acceleration signals due to the difference between the actual and computed normal acceleration. It will be noted that the normal acceleration or inertial path damping signal is automatically inserted into the autopilot whenever a vertical path mode is selected, i.e., when altitude is switched on or when a glide slope mode is rendered operative. Such switching is accomplished through switch K-112-3 (FIG. 1C) closed by energization of vertical path relay K-112 (FIG. 9).

Furthermore, the displacement signal from the altitude control 310 is also applied to the input of the pitch command computer 308 which, in this mode, serves to integrate the same to thereby allow any persistent altitude error to go to zero. In other words, integration of the altitude displacement signal through pitch command computer 308 allows the altitude control mode to be disengaged without a transient.

It will be understood that the operation of the pitch channel of the autopilot in response to an error signal from a radio beam, such as an ILS glide slope beam, will be exactly the same as in the altitude control mode, i.e., that the elevator servo system is controlled in accordance with a glide slope displacement signal, the integral of normal acceleration or the rate of change in altitude which, in the glide slope, is the same as the rate of change of glide slope error, and the integral of any long term glide slope error signal.

The automatic pilot of the present invention may be controlled to automatically seek, approach, and thereafter maintain a flight path defined by radio signals. Radio beam guidance facilities fall generally into two categories, VOR facilities and ILS facilities. As is known, the former provide on route navigation beams while the ILS, of course, provide terminal area or instrument landing radio guidance beams, the latter including overlapping beams for providing localizer guidance in the horizontal plane and glide slope guidance in the vertical plane.

As in the other modes of operation of the autopilot, selection of the desired mode of operation controls interlock circuits whereby the pilot is conditioned for operation in such mode. The following discussion of the radio guidance mode will be divided into three sections; VOR coupling, localizer coupling, and finally glide slope coupling. It will be noted that in FIGS. 4 and 14 certain of the switching and relays schematically illustrated in FIG. 4 have been repeated in FIG. 14, and in the following description reference may be made to either figure for those elements common to each.

When the automatic pilot is first engaged, the turn selector function knob 19 is automatically in its Turn Knob position as above described. Under such conditions, D.C. power is applied to lateral beam sensor relay K-140, closing switches K-140-1 and K-140-2, the latter preventing energization of radio beam coupler "on" relay K-103. With the selector knob 19 in the Turn Knob position, the approach coupler is conditioned for operation upon subsequent turning of the selector knob to the VOR/LOC position.

Assume now that it is desired to approach and maintain a VOR beam. Prior to operation of turn selector knob 19, the pilot selects the desired omnirange frequency as by frequency selector 403 and sets in, through omni-heading selector 404, the bearing of the omniradial he desires to fly. Such omni-heading selector is decribed in detail in U.S. Patent 2,732,550, which is assigned to the same assignee as the present application. As is shown in that patent, the omni-heading selector 404 provides an output signal which is proportional to the angular deviation of the aircraft from the omniheading. That is, the signal is proportional to the angle between the instantaneous heading of the aircraft and the bearing of the omniradial. Of course, through his normal navigation facilities, he may maneuver the craft through the turn knob 14 to a position, as determined by navigation charts, etc., to the vicinity of the selected omnistation. When he desires automatically to approach and thereafter maintain the selected radial he rotates turn function selector knob 19 to the VOR/LOC position. As shown in FIGS. 4 and 14, the selector switch 19 is a "make before break" type switch so that such switching will not deenergize the lateral beam sensor relay K–140.

Before describing further the interlock circuitry of FIG. 14, portions of the beam coupler 400 (FIG. 1A) should be described. Lateral radio receiver 211 provides a signal proportional to the lateral displacement of the craft from the selected radio course. This signal is modulated and amplified at 405 and applied as an input to a position follow-up servo loop 406 which, through feedback connection from potentiometer 407, positions the follow-up shaft 408, through amplifier 409, motor 410, and rate generator 411, to a position corresponding to such lateral displacement. On the output shaft 408 of the approach coupler follow-up servo 406 is the wiper of a sector switch 412. This sector switch comprises two conducting segments, one of which is relatively long and the other fairly short. The approach coupler follow-up loop 406 is so designed that when the aircraft is located at a distance from the beam greater than a first predetermined distance (for example, the distance at which the beam displacement signal is greater than 155 milliamps.), the wiper of the switch 412 will lie on the large sector appropriately labeled plus or minus 155 μa. Similarly, the small sector of the switch represents a second predetermined lateral distance from the beam (for example, a distance represented by a displacement signal of approximately plus or minus 50 milliamps.), so that when the beam is within said predetermined distance from the beam center the wiper will lie on the short sector. This short sector is appropriately labeled plus or minus 50 μa. The nonconductive portion between the ends of the two sectors therefore represents the distance or displacement of the craft from the beam represented by a radio signal having a magnitude between 50 μa. and 155 μa.

At this time it will be pointed out that the gain of the radio signal follow-up loop 406 may be changed under varying beam coupling conditions as by changing the magnitude of the rate feedback signal from generator 411. It should also be mentioned suitable stops on the shaft 408 are provided so that the motor cannot drive the sector switch wiper through an angle greater than 360° in any one direction. Such stops may, for example, be included within the potentiometer 407, suitable clutch means being provided for preventing damage to the servomotor. Now assume that it is desired automatically to approach and maintain the radio beam selected and also that the craft is at a distance greater than that represented by a 155 μa. displacement signal. Also assume that the craft has been placed on a heading which will cause it to intercept the beam. Switching of function selector switch knob 19 to VOR/LOC position merely maintains lateral beam sensor relay K–140 energized through holding switch K–140–1 with the sector switch wiper, of course, being on the larger sector, as illustrated in FIG. 14. As the craft approaches the edge of the beam, the sector switch arm begins to move towards the ends of the contact sector switch 412. As the craft approaches the beam and the displacement signal drops to 155 μa., the wiper of switch 412 leaves the 155 μa. contact sector, thereby deenergizing lateral beam sensor relay K–140 which, in turn, allows switch K–140–2 to move to its deenergize position, thereby energizing radio coupler "on" relay K–103. With the energization of relay K–103, switch K–103–1 (FIG. 1B) closes and applies the sums of the signal proportional to displacement of the craft from the beam and a signal proportional to the heading of the aircraft with respect to the beam to roll control channel of the autopilot. The beam displacement signal is taken directly from the output of the modulator pre-amplifier 405 through an amplification stage 413 while the heading signal is obtained from the omni-heading selector 404. The algebraic sum of these signals is applied to the input of amplifier limiter 228 in the input to the roll command computer 208 where the combined signals command a bank angle proportional thereto, just as in the case of a turn rate command signal.

In the limiter circuit, the radio and heading signals are limited so as to limit the bank angle commanded thereby. With the energization of radio coupler "on" relay K–103, the coupler may be said to be in a bracket mode, and in this mode the limits imposed by limiter 228 are such that relatively large bank angles may be commanded thereby enabling bracketing to occur swiftly. Also, the smooth engage circuit 230 is rendered effective through smooth engage relay K–119 (FIG. 13) and switch K–118–1 controlled thereby as in the heading select mode, this being accomplished by means of switch K–103–3. Smooth engage circuit 230 is essentially a condenser network which serves to allow the roll command signal from the radio coupler to slowly build up over a predetermined time period from zero to the maximum command value. A time constant of about four seconds has been found to be satisfactory for this buildup. The operation of the automatic pilot in response to the bank angle command is the same as its response to a command either by the turn rate knob 14 or the heading selector 210 and will not be repeated.

Since the craft is being controlled in accordance with the displacement from the beam and the rate of approach as determined by the heading of the craft toward the beam, an asymptotic approach path will be executed. As the approach continues, the arm of sector switch 412 will approach the edge of the short contact sector and when the craft is at a distance represented by a signal strength of approximately 55 milliamps., the contact arm will contact this sector. When this occurs, on course relay K–143 will be energized provided that relay switch K–144–1 is deenergized. The latter switch is controlled from cross-course velocity relay K–144 which is energized when the cross-course velocity of the aircraft as determined, in the present VOR coupling mode by the magnitude of the signal from the omni-heading selector which, of course, is a measure of the rate of approach of the craft with respect to the beam. If, for some reason, the cross-course velocity exceeds a predetermined value, for example, a velocity resulting from a difference between the heading of the craft and the bearing of the beam of, say, 15°, determined by cross-course velocity sensor 414 which is any suitable signal magnitude sensing circuit, such as an amplifier suitably biased, the relay K–144 will not deenergize and the on course relay will likewise not be energized, thereby leaving the craft in the bracket condition. Thus, if the initial heading, air speed, etc., conditions could not result in an asymptotic approach, the on course mode will not be instituted and the craft may be allowed to go through an overshoot and continue the bracket until, on the next approach, cross-course velocity falls below the threshold value as determined by sensor 414.

With K–144 deenergized, on course relay K–143 becomes energized. Energization of the latter relay will, through switch K–143–3 (FIG. 1B) bypass an attenuator to thereby increase the effective gain of the beam displacement signal and, through switch K–143–2, add the integral of the beam error signal through roll integrator 11 whereby to more tightly hold the craft on the beam and to compensate for the effects of steady crosswinds tending to blow the craft off course, respectively. Also, on course relay K–143 changes the limits imposed on the bank angle command as by limiter impedance adjustment through switch K–143–6. This change is in a direction to decrease the bank angle commanded by the radio and heading signals since smaller heading changes are required to maintain the beam once the craft has acquired the beam. As a further advantage of such bank limiting, a smoother and more comfortable ride is achieved.

The craft will be maintained on the selected VOR radio through joint effects of the radio displacement, heading and bank angle signals. As the craft approaches the VOR transmitter, the displacement signal will become erratic in a region directly over the transmitter, this region being known as the zone of confusion because no sufficiently well defined radio track information is available for control purposes in this region. Therefore it has been found desirable to sever completely the control of the aircraft through the radio signal and to leave only the heading signal operative to control the craft. This over-the-station control is disclosed in detail in U.S. Patent No. 2,881,992, which is assigned to the same assignee as the present invention. However, a brief description will be included herein for the sake of continuity of disclosure.

In FIG. 1A, it will be noted that when on course relay K–143 is energized (FIG. 14), relay switches K–143–4 and –5 are actuated, the former serving to connect the output of rate generator 411 to the input of an over-the-station sensor amplifier 414 and the latter serving to connect the output of this amplifier to the input of radio beam amplifier 413. As the displacement term becomes erratic, its rate of component as sensed by rate generator 411 will become even more erratic. The over-the-station sensor 414 comprises a circuit which is responsive to a predetermined magnitude of signal applied to its input and will operate to supply an output signal of a predetermined magnitude when the input voltage exceeds its predetermined magnitude. The output of the over-the-station sensor 414 is employed to effectively cut off the operation of displacement signal amplifier 413 such as by biasing the amplifier to cut-off or by other means to thereby effectively remove the radio displacement term from the control system during this period of erratic radio signals. The craft will therefore be caused to maintain the heading it was on at the time the over-the-station sensor became effective. As the craft comes out of the zone of confusion, the rate component of the displacement signal will drop to a low value, and after a predetermined time period thereafter, say, 4 seconds, the displacement amplifier 413 will once again be rendered effective to supply the radio displacement term to the autopilot for continued control of the craft as it continues outbound on the reciprocal VOR radial under the control of the radio displacement, heading and bank angle signals.

If it is desired to use an ILS approach facility, the turn function selector knob 19 should be returned to the Turn Knob position, thus preparing for pilot-inserted maneuvers usually necessary to arrive in the vicinity of a desired ILS localizer beam. As will become apparent, such operation will also avoid any transients which might otherwise occur when tuning to an ILS frequency. When the pilot tunes his frequency selector 403 to an ILS frequency, as indicated schematically at 415, a pair of ILS relays K–126 and K–145 are energized, thereby conditioning the autopilot for an ILS approach. The approach to a localizer beam is very similar to that to a VOR beam except that in the localizer mode the heading is not used as the beam damping or rate of approach term, but the actual rate of approach of the craft as determined by the rate of change of the radio displacement signal is used. This signal is derived at the output of rate generator 411 in the radio displacement follow-up loop 406.

Energization of ILS relays K–126 and K–145 through the selection of an ILS frequency serves to energize switches K–126–1 and K–126–2 which respectively supply a beam displacement signal, suitably attenuated for localizer bracketing and a radio rate signal, also suitably attenuated for a localizer bracket, which two signals are combined and supplied to lateral beam amplifier 413, the output of which is supplied to the automatic pilot turn command channel. It will be noted also that ILS relay K–126–3 serves to remove the heading signal when in the localizer mode.

As in the VOR coupling mode, if the craft is considerably displaced from the localizer beam, i.e., in excess of 155 $\mu$a., lateral beam sensor relay K–140 will be energized and switch K–140–2 will keep radio coupler "on" relay K–103 deenergized. Assuming that the craft is on a heading which will cause it to intercept the beam, when the beam displacement signal drops to a value below 155 $\mu$a., beam sensor relay K–140 will become deenergized, thereby energizing radio coupler "on" relay K–103 as before. As seen in FIG. 1B, the radio coupler "on" relay switch K–103–1 supplies the radio displacement plus rate signal to amplifier limiter 228 to the input of the roll command computer thereby to cause the craft to roll to an angle determined by the limited radio plus radio rate signal. The resultant radio displacement, radio rate, and bank angle signals command an asymptotic approach of the craft to the beam depending upon how far out the approach was initiated. The craft may and very likely will reach a displacement from the beam represented by a 50 $\mu$a. radio signal and the beam sensor switch arm will contact the 50 $\mu$a. sector. However, the craft will continue the approach with no change, i.e., the final approach parameters will not be engaged, until the approach relay K–142 (FIG. 14) becomes energized. This can occur only under certain conditions. ILS frequency selector relay K–145 fulfills a first condition by operation of relay switch K–145–1. The second condition is that the cross-course velocity must be below a predetermined value, say 2 millivolts per second, thereby deenergizing cross-course velocity detector K–144. The third condition is that the turn knob function selector must be in its Glide Path position and the glide slope beam intercepted.

ILS frequency relay K–145 also energizes switch K–145–4 (FIG. 1A) which supplies the rate of change of localizer signal to the cross-course velocity sensor 414 in place of the heading signal used in the VOR mode. The cross-course velocity sensor is for the purpose of preventing premature engagement in the approach mode control parameters. Therefore, unless the rate of approach is below said predetermined minimum the approach mode cannot be engaged. In order that the third condition be satisfied, turn function selector knob 19 is rotated to its glide path position, thereby arming the coupler for automatic glide path beam coupling. This arming is indicated to the pilot by the glide path arm light 416. It will be noted that should the turn function selector knob 19 be inadvertently moved to the glide path position when no ILS function has in fact been selected, nothing will happen inasmuch as ILS switch K–145–3 open-circuits the glide slope interlock circuits.

Assuming now that the craft is within the 50 $\mu$a. portion of the beam and is being maintained on the beam by the radio and radio rate signals, and that the craft is approaching the glide slope beam from the underside thereof. Vertical beam sensor 414 (this may be the same circuit employed for the over-the-station sensor) will prevent premature engagement of the glide slope control and also premature switching of the lateral channel to its approach parameters until the aircraft is about to intercept the center of the glide slope beam. The vertical beam sensor derives its input signal from the glide path receiver 311 through now closed relay switch K–143–4. Its output, when the glide slope beam error signal drops below a predetermined value, for example, 15 millivolts, controls vertical beam sensor relay K–146 which, in turn, energizes glide path engage relay K–147. The latter relay fulfills the third condition mentioned above by closing switch K–147–2 in the approach relay K–142 energization circuit. As approach relay K–142 is energized, a holding circuit, through ILS relay switch K–145–3 and approach relay switch 142–1, is established so that further operation of the cross-course velocity detector switch K–144–1 will not deenergize the approach relay. It will also be noted that a second approach relay K–122 is energized through approach relay switch K–142–2.

The craft is now in its final approach maneuver and in order to provide very tight beam coupling various gains in the approach coupler are changed. In the first place, the gain of the displacement follow-up loop 406 is changed by operation of approach relay switch K–122–1 in a direction to increase the response of the follow-up loop to lateral beam displacements. At the same time, the magnitude of the displacement signal supplied to the autopilot through amplifier 413 is increased through approach relay switch K–122–3, and finally, the magnitude of the rate signal supplied to the autopilot is also increased through operation of approach relay switch K–122–2. In this manner, the craft is controlled to precisely follow the localizer beam during the approach mode. Since large bank angles are to be avoided in the final approach configuration, the bank limiter is adjusted by means of switch K–122–4 to decrease the limits imposed upon the sum of the radio and radio rate signals, that is, to reduce the magnitude of the sum signal which it can pass. It will be further noted that any standoff errors which may accumulate during the approach are eliminated through the operation of the roll integrator 11 which is rendered responsive to any standoff displacement error through approach relay switch K–142–3.

In order to increase the yaw stability of the craft during the aproach maneuver, a signal from the directional gyro 107 (FIG. 1B) is inserted into the rudder channel in such a manner that short term yaw gusts are opposed while long term turn commands by the radio are unopposed. This is accomplished through yaw follow-up high tachometer gradient relay K–171 (FIG. 14) which is energized simultaneously with the energization of approach relay K–122. Energization of this relay serves through switch K–171–1 to decrease the gain through the yaw follow-up loop 108 so that it can readily follow up on long term gyro signals, yet at the same time be unable to follow up on short term gyro signal. Thus, any short term deviations of the craft in yaw, such as produced by lateral gusts, etc., are fed directly to the rudder servo system through approach relay switch K–142–4.

During the approach mode, the elevator channel of the autopilot is controlled in accordance with displacement of the craft vertically from the center of the glide slope beam. Any deviation of the craft from the beam is detected by glide slope receiver 311 which supplies an error signal to the elevator servo system through amplifier limiter 321 which operates in the glide slope mode, exactly as in the altitude control mode, to provide a displacement reference command signal for the elevator servo system. Additionally, and again as in the altitude control mode, any persistent glide slope displacement signal is integrated out through the operation of the pitch command computer 302 which has been placed in its integrator mode of operation. The latter is accomplished through vertical path relay K–112 becoming energized when glide path engage relay K–147 became energized, i.e., through switch K–147–4 (FIG. 9); this, in turn, energizing pitch computer gear shift solenoid MG–101. Inertial path damping is also provided in the approach mode as in the altitude control mode through the operation of vertical path relay K–112 through its switch K–112–3, which supplies a signal in accordance with the vertical acceleration of the craft, the latter signal being supplied to the pitch command computer 302 where it is integrated and appears in its output as a rate of change of height signal. Therefore, the craft is controlled to precisely follow the glide slope beam through the combined effect of the displacement of the craft on the beam, the rate of change of height of the craft, and the time integral of the displacement.

It will be noted that in the radio coupling modes of operation of the autopilot, the switching sequences which occur automatically from initial bracketing to "on course" or "approach" are dependent solely upon the position and/or movement of the craft with respect to the beam, thereby providing a very positive coupling to the beam.

From the foregoing specification, it will be clear that the autopilot disclosed herein is similar in a great many respects to that disclosed in the above-identified copending parent application and yet there are herein disclosed many novel features not specifically set forth in the parent application. However, although specific and detailed disclosures of the autopilot of the present invention have been set forth, it is clearly apparent that many changes could be made in this specific construction and many widely different embodiments could be constructed without departing from the true scope and spirit thereof. Therefore, it is intended that all matter contained in the above description or shown in the accompanying drawings should be interpreted as illustrative and not in a limiting sense.

What is claimed is:

1. In an automatic pilot for aircraft adapted to be controlled so as to approach a radio beam and thereafter to maintain said beam, the combination comprising means for supplying a plurality of signals each proportional to the displacement of the craft from said radio beam and each having a different predetermined value for the same displacement, means for supplying a signal proportional to the heading of the craft with respect to the bearing of said beam, first sensor means responsive to a first magnitude of one of said radio displacement signals for combining another of said radio displacement signals and said heading signal, and second sensor means responsive to a second magnitude of said one radio displacement signal for combining a further radio displacement signal and said heading signal whereby the sensitivity of the control of said craft by said radio and heading signals is varied in accordance with the displacement thereof from the beam.

2. In an automatc pilot for aircraft aadpted to be controlled so as to approach a radio beam and thereafter to maintain said beam, the combination comprising means for supplying a plurality of signals each proportional to the displacement of the craft from said radio beam and each having a different predetermined value for the same displacement, means for supplying a signal in accordance with the rate of approach of the craft with respect to the bearing of said beam, first sensor means responsive to a first magnitude of one of said radio displacement signals for combining another of said radio displacement signals and said rate of approach signal, and second sensor means responsive to a second magnitude of said one radio displacement signal for combining a further radio displacement signal and said rate of approach signal whereby the sensitivity of the control of said craft is varied as a function of the displacement of the craft from the beam.

3. Apparatus as set forth in claim 2, wherein the means for providing said one displacement signal comprises a shaft positioned in accordance with the displacement of the craft from the radio beam, wherein said first sensor means comprises a first sector switch positioned by said shaft having an elongated sector representative of a relatively large magnitude of said beam displacement, and wherein said second sensor means comprises a second sector switch having a relatively short sector representative of a relatively small displacement of the craft from said beam.

4. In an automatic pilot for aircraft adapted to be controlled so as to approach a radio-defined beam and thereafter to maintain said beam and wherein the relative values of the control signals controlling said autopilot are changed upon substantial completion of said approach, the combination comprising means for providing a signal proportional to displacement of said craft from said beam, means for supplying a signal proportional to the heading of the aircraft with respect to the bearing of said beam, means for controlling the aircraft in accordance with the algebraic sum of said signals whereby to cause said craft to asymptotically approach said beam, means responsive to a predetermined low value of said heading signal for supplying an output proportional to said value, and means responsive to said output signal for changing the relative values of the signals controlling said autopilot.

5. In an automatic pilot for aircraft adapted to be controlled so as to approach a radio defined beam and thereafter to maintain said beam and wherein the relative values of the control signals controlling said autopilot are changed upon completion of said approach, the combination comprising means for providing a signal proportional to displacement of said craft from said beam, means for supplying a signal proportional to the rate of approach of the aircraft with respect to said beam, means for controlling the aircraft in accordance with the algebraic sum of said signals whereby to cause said craft to asymptotically approach said beam, means responsive to a predetermined low value of said rate signal for supplying an output proportional to said value, and means responsive to said output signal for changing the relative values of the signals controlling said autopilot.

References Cited in the file of this patent
UNITED STATES PATENTS

| | | |
|---|---|---|
| 2,932,023 | Haskins | Apr. 5, 1960 |
| 2,993,665 | Carpenter | July 25, 1961 |